United States Patent
Tanaka et al.

(10) Patent No.: US 10,063,384 B2
(45) Date of Patent: Aug. 28, 2018

(54) MULTIPLEXING DEVICE AND MULTIPLEXING METHOD

(71) Applicant: KABUSHIKI KAISHA TOSHIBA, Minato-ku (JP)

(72) Inventors: Tatsuya Tanaka, Kawasaki (JP); Keita Iwami, Fuchu (JP); Yasumichi Hashi, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 64 days.

(21) Appl. No.: 15/370,914

(22) Filed: Dec. 6, 2016

(65) Prior Publication Data

US 2017/0170975 A1 Jun. 15, 2017

(30) Foreign Application Priority Data

Dec. 15, 2015 (JP) ................................ 2015-244156

(51) Int. Cl.
*H04L 12/18* (2006.01)
*H04L 12/861* (2013.01)
(Continued)

(52) U.S. Cl.
CPC .......... *H04L 12/18* (2013.01); *H04L 49/9047* (2013.01); *H04L 65/602* (2013.01);
(Continued)

(58) Field of Classification Search
None
See application file for complete search history.

(56) References Cited

U.S. PATENT DOCUMENTS

2005/0010960 A1* 1/2005 Kitazawa ......... H04N 21/23655
725/117
2006/0193348 A1* 8/2006 Unno ..................... H04H 20/28
370/535
(Continued)

FOREIGN PATENT DOCUMENTS

JP 2011-103568 5/2011
JP 2015-61315 3/2015

OTHER PUBLICATIONS

Arib STD B-44 Version 2.0 (English Standard Translation), Arib Standard, 2014, 136 pages.
(Continued)

*Primary Examiner* — Afsar M Qureshi
(74) *Attorney, Agent, or Firm* — Oblon, McClelland, Maier & Neustadt, L.L.P.

(57) ABSTRACT

According to an embodiment, a multiplexing device includes: a packet generating unit which generates one or more third packets based on at least one of one or more first packets and a second packet; a main signal generating unit which generates from the third packets a main signal; an information generating unit which generates transmission multiplexing control information; a slot generating unit which generates a slot by combining the transmission multiplexing control information and the main signal corresponding to the information described in the transmission multiplexing control information having been generated a predetermined number of frames prior to the currently generated transmission multiplexing control information; and a time writing unit which writes a time in the second packet in the main signal included in the generated slot.

18 Claims, 5 Drawing Sheets

(51) Int. Cl.
  *H04L 29/06* (2006.01)
  *H04N 21/236* (2011.01)
  *H04N 21/2381* (2011.01)
  *H04N 21/242* (2011.01)
  *H04N 21/43* (2011.01)
  *H04N 21/434* (2011.01)
  *H04N 21/643* (2011.01)
  *H04N 21/854* (2011.01)

(52) U.S. Cl.
  CPC .......... *H04L 69/22* (2013.01); *H04N 21/236* (2013.01); *H04N 21/2381* (2013.01); *H04N 21/242* (2013.01); *H04N 21/434* (2013.01); *H04N 21/4305* (2013.01); *H04N 21/64322* (2013.01); *H04N 21/85406* (2013.01)

(56) References Cited

U.S. PATENT DOCUMENTS

2007/0025473 A1* 2/2007 Aizawa ............... H03M 13/132
  375/324
2010/0166008 A1* 7/2010 Hashimoto ............. H04L 27/38
  370/458
2015/0041795 A1* 2/2015 Suzuki ................. H01L 51/5016
  257/40
2016/0192028 A1* 6/2016 Iguchi ............. H04N 21/64322
  725/67
2017/0055046 A1* 2/2017 Lee ....................... H04N 21/234
2017/0359611 A1* 12/2017 Iguchi ................ H04N 21/4305
2018/0007421 A1* 1/2018 Yoo .................... H04N 21/4345

OTHER PUBLICATIONS

Sung Oh Hwang. et al., "Guidelines on how to provide MMT transport over Broadcasting Network", MMT over DVB-T2 CE Participants, Apr. 2014, 9 Pages.

Extended European Search Report dated May 12, 2017 in European Patent Application No. 16202630.6.

Sung Oh Hwang. et al., 'Guidelines on how to provide MMT transport over Broadcasting Network', MMT over DVB-T2 CE Participants, Apr. 2014, 9 Pages.

* cited by examiner

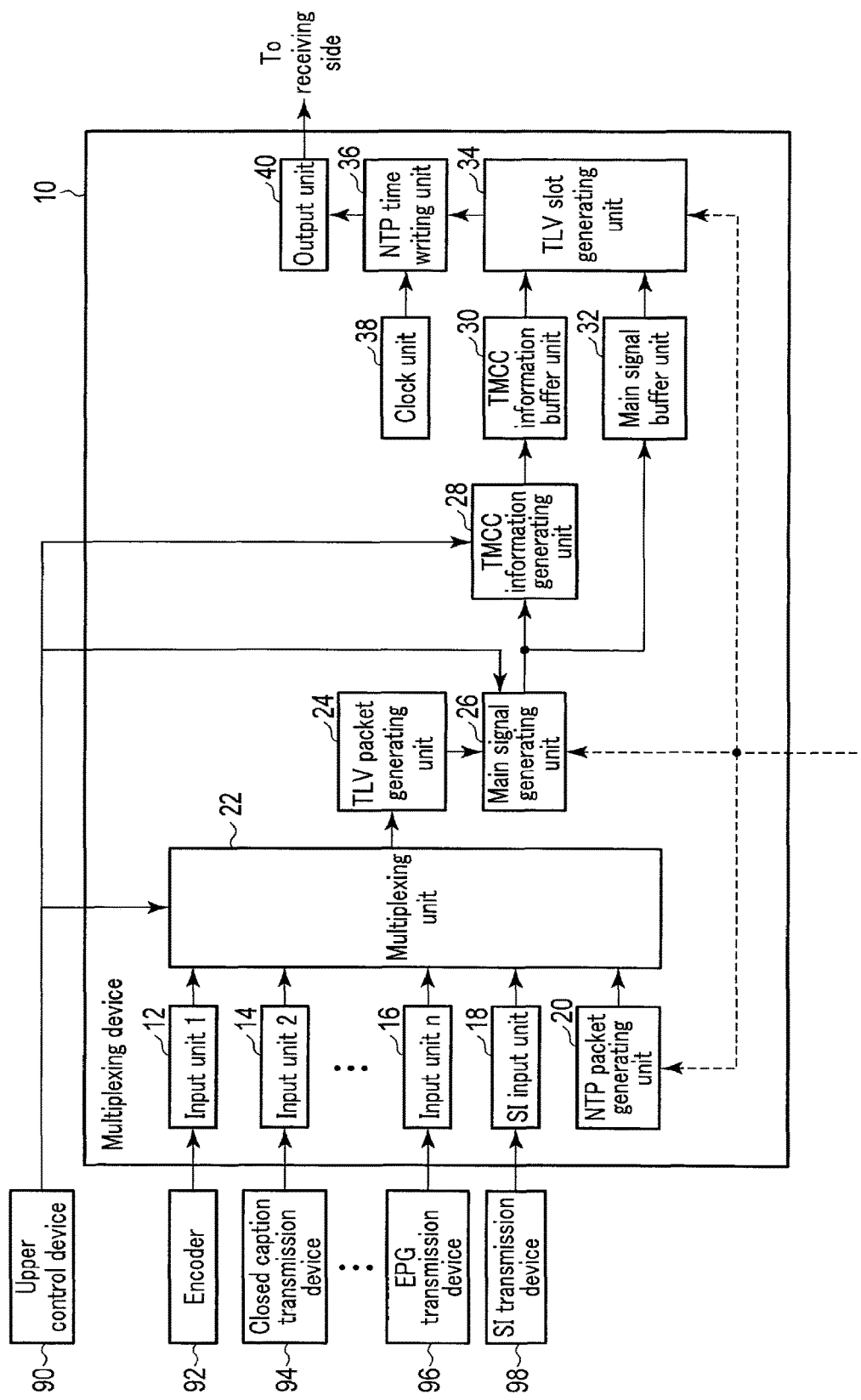
F I G. 3

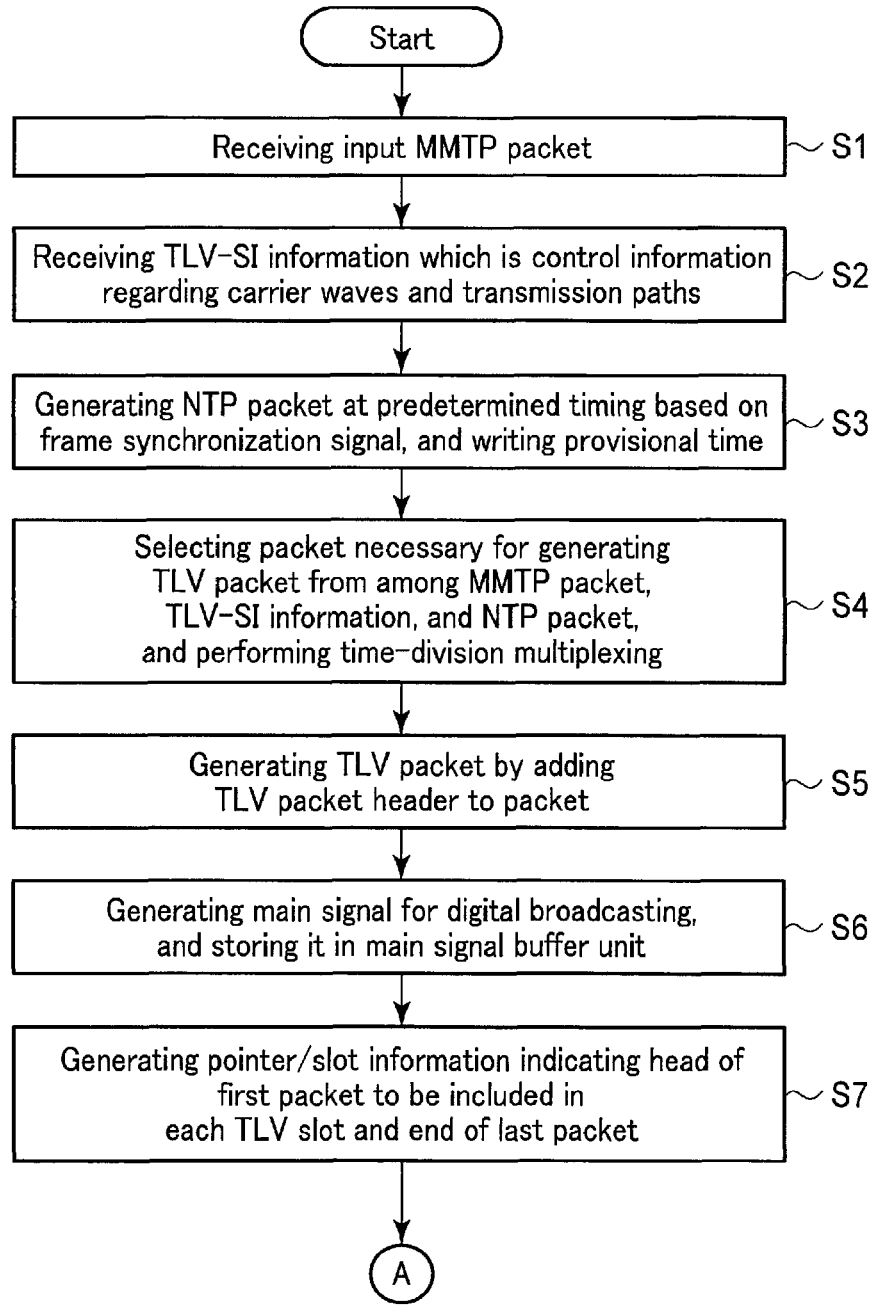
F I G. 4

MULTIPLEXING DEVICE AND MULTIPLEXING METHOD

CROSS-REFERENCE TO RELATED APPLICATIONS

This application is based upon and claims the benefit of priority from Japanese Patent Application No. 2015-244156, filed Dec. 15, 2015, the entire contents of which are incorporated herein by reference.

FIELD

Embodiments of the present invention relate to a multiplexing device and a multiplexing method for digital broadcasting.

BACKGROUND

According to STD-B44 "Transmission system for advanced wide band digital satellite broadcasting" of the Association of Radio Industries and Businesses (ARIB), which is an industry organization carrying out standards development regarding mobile phones and digital broadcasting in Japan, it is necessary to transmit an IP packet including a Network Time Protocol (NTP) format by suppressing delay variation, and to place the IP packet in the first slot among slots assigned to each Type Length Value (TLV) stream ID.

FIG. 1 shows a configuration of a TLV frame described in ARIB STD-B44. A detailed explanation will be omitted, however, Transmission and Multiplexing Configuration Control (TMCC) information is written in the 165 bytes at the end of each slot (Slot #1, #2, . . . #24) for a main signal. The TMCC information comprises information related to transmission control, such as the transmission stream allocation for each slot and the relationship between transmission schemes and each slot. One TVL frame comprises 120 slots. The configuration of a TLV frame is not limited to only the configuration described in the drawing.

According to ARIB STD-B44, in the case of switching transmission schemes, etc., the TMCC information is required to transmit the post-switching information two frames prior to the main signal. That is, in order to advance the TMCC information for the switching by two frames, it is necessary to delay the main signal from that TMCC information by two frames.

FIG. 2 shows the relationship between the TMCC information for switching and the main signal delayed by two frames. For example, pointer/slot information described in the TMCC information of the first slot of frame (N−2) describes the front or head position of the first packet included in the first slot of frame N and the end position of the last packet in the first slot of frame N. Since one frame is approximately 33 milliseconds (ms) (33.0464716 ms), transmission timings of the TMCC information and the main signal indicated by the pointer/slot information described in that TMCC information are in a relationship where the output of the main signal is delayed approximately 66 ms with respect to the transmission timing of that TMCC information.

As a result, a delay corresponding to two frames (approximately 66 ms) occurs between a time written in an NTP packet multiplexed on a TLV slot and a time when transmitting that TLV slot.

Since this delay lengthens a period between a receiving time of a video/audio packet at a receiver and a starting time of decoding/displaying by approximately 66 ms, a buffer size of the receiver for buffering data during such period increases.

Since the start of decoding/displaying the video and audio at the receiver is performed based on a system time, the delay in broadcasting increases, thereby degrading real-time properties.

Therefore, the realization of a multiplexing device and a multiplexing method capable of solving the delay between a time written in the NTP packet and a timing for transmitting the TLV slot has been desired.

BRIEF DESCRIPTION OF THE DRAWINGS

FIG. 3 is a functional block diagram showing a configuration example of a multiplexing device in which a multiplexing method of a present embodiment is implemented.

FIG. 4 is a flowchart (anterior half) showing an operational example of the multiplexing device in which the multiplexing method of the present embodiment is implemented.

DETAILED DESCRIPTION

Figure 1:
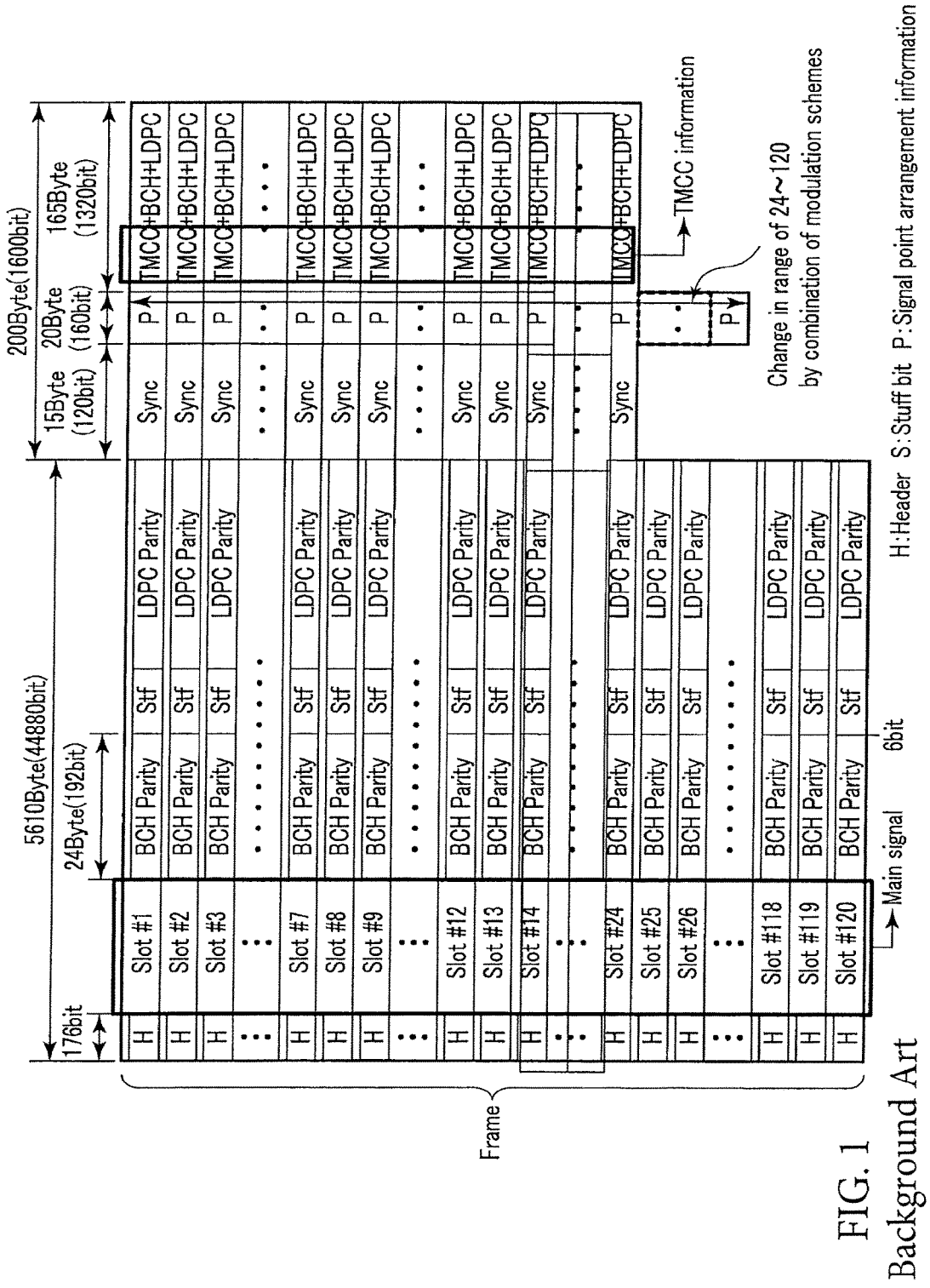
FIG. 1 shows a configuration of a TLV frame in accordance with an ARIB STD-B44 standard.

A multiplexing device in which a multiplexing method of an embodiment of the present invention is implemented will now be explained with reference to the drawings.

FIG. 3 is a functional block diagram showing a configuration example of the multiplexing device in which the multiplexing method of the present embodiment is implemented.

Here, a multiplexing device 10 in which the multiplexing method of the present embodiment is implemented comprises a CPU (Central Processing Unit), and a memory such as a ROM (Read Only Memory) for storing data and application programs to be performed by the CPU, and RAM (Random Access Memory) to be used by the CPU which performs the application programs with the data. The multiplexing device 10 actualizes a plurality of input units (for example, an input unit 1 12, an input unit 2 14, . . . an input unit n 16), a Signaling Information (SI) input unit 18, an NTP packet generating unit 20, a multiplexing unit 22, a TLV packet generating unit 24, a main signal generating unit 26, a TMCC information generating unit 28, a TMCC information buffer unit 30, a main signal buffer unit 32, a TLV slot generating unit 34, an NTP time writing unit 36, a clock unit 38, and an output unit 40 by causing the CPU to perform the application programs stored in the ROM using the RAM. This multiplexing device 10 is preferably applied to satellite digital broadcasting, but is not limited thereto.

The input unit 1 12, the input unit 2 14, and so on to the input unit n 16 receive data in an MMTP packet form, such as a video, audio, a still image, and a character text, from, for example, an encoder 92, a closed caption transmission device 94, and an EPG transmission device 96, of a broadcasting station, etc., and output them to the multiplexing unit 22.

The SI input unit 18 receives TLV-SI information which is control information regarding carrier waves and transmission paths in accordance with one or more settings from an SI transmission device 98 of the broadcasting station, etc., and outputs it to the multiplexing unit 22.

The NTP packet generating unit 20 generates NTP packets at a predetermined cycle based on a frame synchronization signal A input externally, and outputs them to the multiplexing unit 22. The NTP packet generating unit 20 also writes a provisional time on the generated NTP packet.

The multiplexing unit 22 receives at least one of MMTP packets output from the input units 12 to 16, the TLV-SI information output from the SI input unit 18, and the NTP packet with the provisional time written which is output from the NTP packet generating unit 20. One or more packets necessary for generating the TLV packet are selected from among those received packets in accordance with the settings from an upper control device 90 of the broadcasting station, etc., and are output to the TLV packet generating unit 24.

The TLV packet generating unit 24 adds a predetermined packet header to the one or more packets output from the multiplexing unit 22, generates the one or more TLV packets, and outputs them to the main signal generating unit 26.

The main signal generating unit 26 detects a TLV slot generation timing in accordance with the frame synchronization signal A. When the TLV slot generation timing is detected, the one or more TLV packets output from the TLV packet generating unit 24 are multiplexed in a main signal region to be included within a TLV slot based on a modulation scheme and a code rate designated by the upper control device 90 of the broadcasting station, etc., thereby generating a main signal for digital broadcasting, and outputting it to the main signal buffer unit 32.

The main signal generating unit 26 also generates, from the multiplexing result, pointer/slot information which is position information indicating the front or head position of the first packet to be included in each TLV slot and the end position of the last packet in that slot, and outputs it to the TMCC information generating unit 28.

The TMCC information generating unit 28 generates TMCC information based on the one or more settings from the upper control device 90 of the broadcasting station, etc. and the pointer/slot information output from the main signal generating unit 26.

The TMCC information buffer unit 30 stores the TMCC information generated by the TMCC information generating unit 28.

The main signal buffer unit 32 stores the main signal generated by the main signal generating unit 26.

Figure 2:
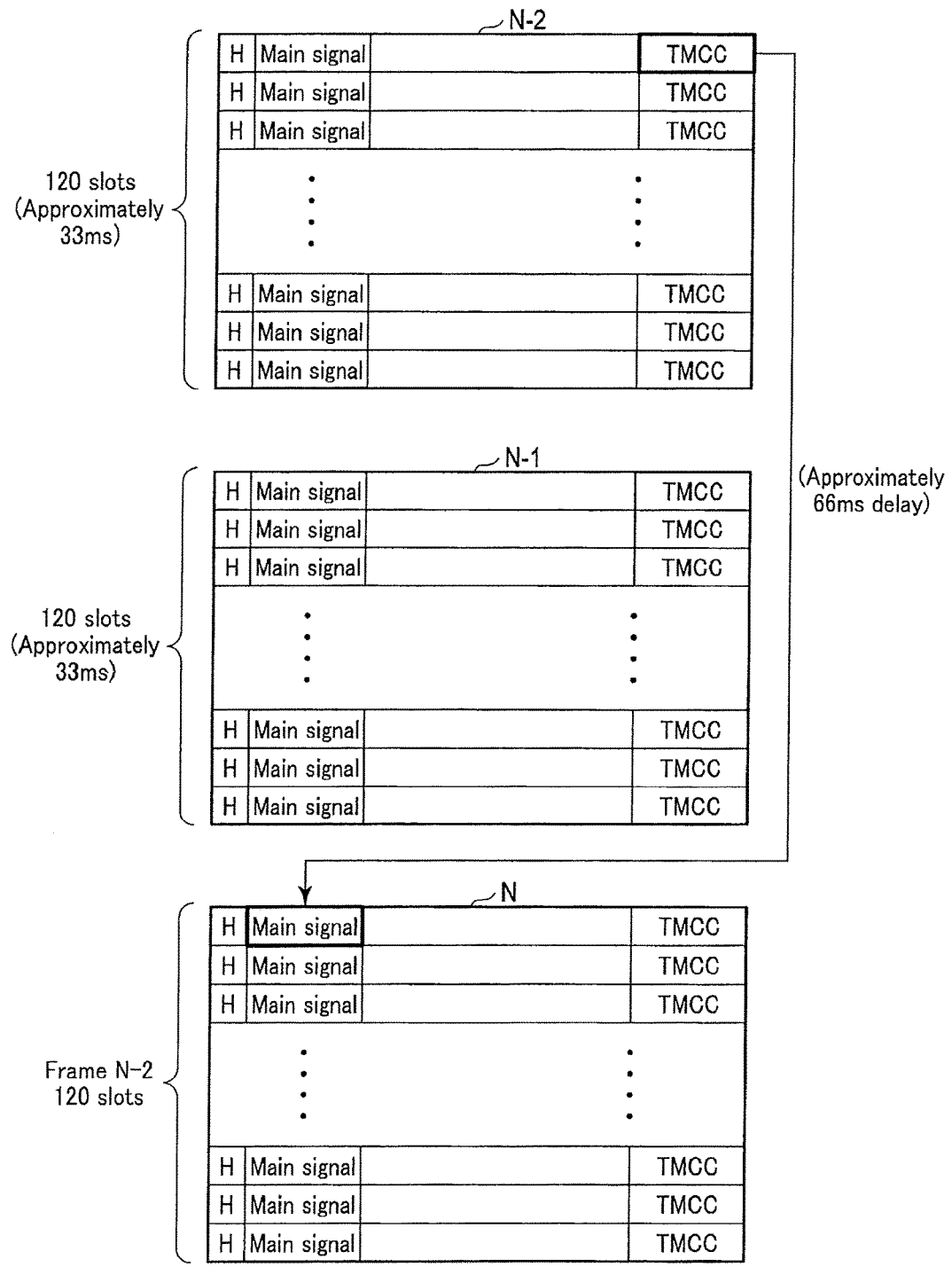
FIG. 2 is a schematic diagram showing a relationship between TMCC information and a main signal delayed by two frames.

The TLV slot generating unit 34 detects a TLV slot transmission timing based on the frame synchronization signal A. When the TLV slot transmission timing is detected, the TMCC information is obtained from the TMCC information buffer unit 30. The main signal corresponding to the pointer/slot information described in obtained TMCC information is obtained from the main signal buffer unit 32. Specifically, as shown in FIG. 2, the TMCC information in the (N−2) th frame and data of a main signal for the Nth frame are obtained. The TMCC information and the main signal are combined to generate a TLV slot, which is output to the NTP time writing unit 36. As mentioned above, the main signal includes the NTP packet in which the provisional time is written. Furthermore, as mentioned above, this main signal is delayed two frames from the TMCC information.

When the TLV slot is output from the TLV slot generating unit 34, the NTP time writing unit 36 overwrites the time having been written in the NTP packet contained in the main signal included in this TLV slot with a current time provided from the clock unit 38, thereby rewriting the time of the NTP packet as the current time. The TLV slot in which the time of the NTP packet is rewritten in this manner is output to the output unit 40. The NTP time writing unit 36 also recalculates and rewrites a UDP checksum value of an UDP/IP packet which stores the NTP packet.

The output unit 40 IP packetizes (e.g. into TLV slot/IP) the TLV slot output from the NTP time writing unit 36, and transmits it to a receiving side, such as to each household via a satellite broadcasting network.

The transmitted TLV slot is received at a receiver (not shown) at the receiving side. At the receiver, a system time of the receiver is set right based on the time written in the NTP packet multiplexed on the TLV slot. The time written in the NTP packet has been rewritten with the current time provided from the clock unit 38 at the NTP time writing unit 36 immediately before the TLV slot is output from the multiplexing device 10. Therefore, the time at which the TLV slot is output from the multiplexing device 10 (output unit 40) and the system time of the receiver are made to coincide.

Figure 5:
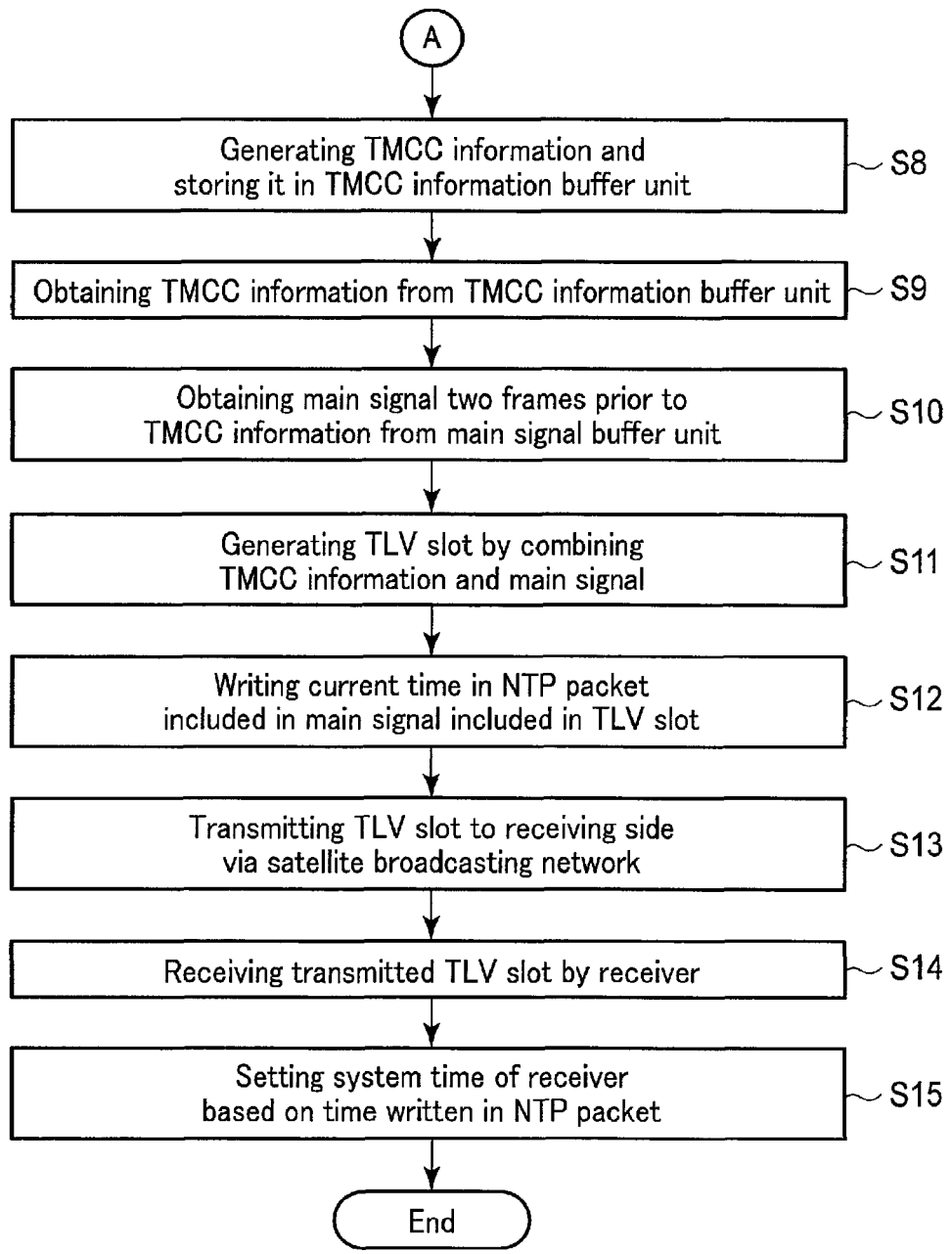
FIG. 5 is a flowchart (posterior half) showing the operational example of the multiplexing device in which the multiplexing method of the present embodiment is implemented.

Now, the operation example of the multiplexing device 10 in which the multiplexing method of the present embodiment configured in the above manner is implemented will be explained using the flowcharts of FIG. 4 and FIG. 5.

In the multiplexing device 10, data in an MMTP packet foam such as a video, audio, a still image, and a character text input from, for example, an encoder 92, a closed caption transmission device 94, and an EPG transmission device 96 of a broadcasting station, etc., is received at the input unit 1 12, the input unit 2 14, and so on to the input unit n 16, and is output to the multiplexing unit 22 (S1).

In the SI input unit 18, the TLV-SI information, which is control information regarding carrier waves and transmission paths, is received in accordance with the one or more settings from the SI transmission device 98 of the broadcasting station, etc., and is output to the multiplexing unit 22 (S2).

In the NTP packet generating unit 20, the NTP packets are generated at a predetermined cycle based on the frame synchronization signal A input externally, and are output to the multiplexing unit 22 (S3). At this time, at the NTP packet generating unit 20, a provisional time is written in the generated NTP packet.

Although the steps S1 to S3 mentioned above are described as consecutive steps in FIG. 4, the steps are not limited to this order, and may be carried out in any order. The steps may also be performed in parallel.

After steps S1 to S3, in the multiplexing unit 22, one or more packets necessary for generating the TLV packet are selected from among the MMTP packets output in step S1, the TLV-SI information output in step S2, and the NTP packet output in step S3 in accordance with the one or more settings from the upper control device 90 of the broadcasting station, etc., and is time-division multiplexed (S4). The time-division multiplexed packets are output from the multiplexing unit 22 to the TLV packet generating unit 24.

In the TLV packet generating unit 24, by adding a predetermined packet header to the one or more packets output from the multiplexing unit 22, the TLV packets are generated and are output to the main signal generating unit 26 (S5).

In the main signal generating unit 26, the TLV slot generation timing is detected in accordance with the frame synchronization signal A. When the TLV slot generation timing is detected, the one or more TLV packets output from the TLV packet generating unit 24 are multiplexed in the main signal region to be included within the TLV slot based on the modulation scheme and the code rate designated by the upper control device 90 of the broadcasting station, etc., thereby generating the main signal for digital broadcasting (S6). The generated main signal is output to the main signal buffer unit 32 and stored.

In the main signal generating unit 26, the pointer/slot information, which is position information indicating the front or head position of the first packet to be included in each TLV slot and the end position of the last packet of that TLV Slot, is also generated from the result of the multiplexing carried out in step S6, and is output to the TMCC information generating unit 28 (S7).

After step S7, in the TMCC information generating unit 28, the TMCC information is generated based on the settings from the upper control device 90 of the broadcasting station, etc. and the pointer/slot information output from the main signal generating unit 26 (S8). In this manner, the TMCC information generated by the TMCC information generating unit 28 is stored in the TMCC information buffer unit 30.

Subsequently, in the TLV slot generating unit 34, the TLV slot transmission timing is detected based on the frame synchronization signal A. In the TLV slot generating unit 34, when the TLV slot transmission timing is detected, the TMCC information is obtained from the TMCC information buffer 30 (S9). Furthermore, a main signal corresponding to the pointer/slot information described in the previous TMCC information, which has been generated two frames before the TMCC information is obtained in step S9, is obtained from the main signal buffer unit 32 (S10). The processing in step S9 and step S10 may also be carried out in any order. The steps may also be performed in parallel.

Furthermore, the TMCC information obtained in step S9 and the main signal obtained in step S10 are combined to generate the TLV slot (S11). The generated TLV slot is output to the NTP time writing unit 36. As mentioned above, the main signal includes the NTP packet in which the provisional time has been written. Furthermore, as mentioned above, this main signal is delayed two frames from the TMCC information.

In the NTP time writing unit 36, the time having been written in the NTP packet contained in the main signal included in the TLV slot output from the TLV slot generating unit 34 is overwritten with the current time provided from the clock unit 38 (S12). In this manner, the time written in the NTP packet is rewritten as the current time. The TLV slot in which the time of the NTP packet is rewritten in this manner is output to the output unit 40. The NTP time writing unit 36 also recalculates and rewrites the UDP checksum value of the UDP/IP packet which stores the NTP packet.

In the output unit 40, the TLV slot output from the NTP time writing unit 36 is IP packetized (e.g. into TLV slot/IP), and after then, the packetized TLV slot is transmitted to a receiving side, such as to each household, via a satellite broadcasting network (S13).

The transmitted TLV slot is received at a receiver (not shown) at the receiving side (S14). At the receiver, the system time of the receiver is set right based on the time written in the NTP packet multiplexed in the TLV slot (S15).

In this manner, the time having been written in the NTP packet is rewritten with the current time provided from the clock unit 38 at the NTP time writing unit 36 immediately before the TLV slot is output from the output unit 40. Therefore, the time at which the TLV slot is output from the multiplexing device 10 (output unit 40), and the system time of the receiver are made to coincide.

In this manner, according to the multiplexing device in which the multiplexing method of the present embodiment is implemented, the time at which the TLV slot is output from the multiplexing device 10 (output unit 40) and the system time of the receiver are made to coincide.

Therefore, the problem of the prior art, such as the problem of enlarging a delay upon broadcasting, or degrading real-time properties, may be solved. Furthermore, it would be unnecessary to enlarge the buffer of the receiver.

As an alternative example, at the TLV slot generating unit 34, IP encapsulation may be performed after the TLV slot is generated. In this case, the NTP time writing unit 36 rewrites the time of the NTP packet by overwriting the time having been written in the NTP packet with the current time provided from the clock unit 38 after the IP encapsulation.

In the NTP time writing unit 36, only the UDP checksum of the IP packet encapsulating the NTP packet is recalculated. When doing so, since the time writing process performed by the NTP time writing unit 36 does not affect the checksum of the UDP header for the TLV slot, it is unnecessary to perform checksum recalculation of the UDP header for the TLV slot. According to this procedure, the influence of the delay/jitter for the UDP/IP header generation process for the TLV slots may be eliminated.

While some embodiments of the present invention have been explained, these embodiments have been presented only as an example, and are not intended to limit the scope of the inventions. Indeed, the embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

The invention claimed is:
1. A multiplexing device comprising:
a packet generating unit which generates one or more third packets based on at least one of one or more first packets and a second packet;
a main signal generating unit which generates from the one or more third packets a main signal for digital broadcasting including the second packet at a predetermined cycle;
an information generating unit which generates transmission multiplexing control information for the digital broadcasting based on information obtained in a process of generating the main signal;
a slot generating unit which generates a slot by combining the generated transmission multiplexing control information and the main signal corresponding to the information described in the transmission multiplexing control information having been generated a predetermined number of frames prior to currently generated transmission multiplexing control information; and
a time writing unit which, when the generated slot is being transmitted to a receiving side, writes a time in the second packet included in the main signal included in the generated slot.

2. The multiplexing device according to claim 1, further comprising:

a multiplexing unit which receives at least one of the one or more first packets and the second packet and transmits one or more packets necessary for generating the one or more third packets to the packet generating unit in accordance with at least one setting from an upper side, wherein the packet generating unit adds a predetermined packet header to the one or more packets transmitted from the multiplexing unit to generate the one or more third packets.

3. The multiplexing device according to claim 1, further comprising:

a first buffer which stores the transmission multiplexing control information generated by the information generating unit; and a second buffer which stores the main signal generated by the main signal generating unit.

4. The multiplexing device according to claim 3, wherein the main signal generating unit multiplexes the one or more third packets generated by the packet generating unit in a main signal region to be included within the slot based on a designated modulation scheme and code rate, stores the multiplexed main signal in the second buffer, and generates, from a multiplexing result, position information indicating a head position of a first packet and an end position of a last packet to be included in each of a plurality of slots.

5. The multiplexing device according to claim 4, wherein the information generating unit generates the transmission multiplexing control information based on the position information.

6. The multiplexing device according to claim 3, wherein the slot generating unit obtains the transmission multiplexing control information from the first buffer based on a designated frame synchronization signal, obtains, from the second buffer, the main signal corresponding to the position information described in the transmission multiplexing control information having been generated the predetermined number of frames prior to the currently obtained transmission multiplexing control information, combines the obtained transmission multiplexing control information and the obtained main signal, and generates the slot.

7. The multiplexing device according to claim 1, further comprising:

a clock unit which notifies a time to the time writing unit, and wherein the time writing unit writes the time notified by the clock unit in the second packet.

8. The multiplexing device according to claim 7, further comprising:

a second packet generating unit which generates the second packet, and wherein in a case where the second packet is generated, the second packet generating unit writes a provisional time in the second packet, and the time writing unit writes the time notified by the clock unit in the second packet by overwriting the provisional time having been written in the second packet by the second packet generating unit with the time notified by the clock unit.

9. The multiplexing device according to claim 1, wherein the one or more first packets comprise an MMTP packet, the second packet comprises an NTP packet, the one or more third packets comprise a TLV packet, the transmission multiplexing control information comprises TMCC information, the slot comprises a TLV slot, and the predetermined number of frames comprise two frames.

10. A multiplexing method comprising:

generating one or more third packets based on at least one of one or more first packets and a generated second packet;

generating from the one or more third packets a main signal for digital broadcasting including the second packet at a predetermined cycle;

generating transmission multiplexing control information for the digital broadcasting based on information obtained in a process of generating the main signal;

generating a slot by combining the generated transmission multiplexing control information and the main signal corresponding to the information described in the transmission multiplexing control information having been generated a predetermined number of frames prior to currently generated transmission multiplexing control information; and writing a time, when the generated slot is being transmitted to a receiving side, in the second packet included in the main signal included in the generated slot.

11. The multiplexing method according to claim 10 comprising:

in a case of generating the one or more third packets, generating the one or more third packet by adding a predetermined packet header to one or more packets which are selected from among the one or more first packets and the second packet in accordance with at least one setting from an upper side, and which are necessary for generating the one or more third packet.

12. The multiplexing method according to claim 10 comprising:

storing the generated transmission multiplexing control information in a first buffer; and storing the generated main signal in a second buffer.

13. The multiplexing method according to claim 12 comprising:

in a case of generating the main signal, multiplexing the generated one or more third packets in a main signal region to be included within the slot based on a designated modulation scheme and code rate, storing the multiplexed main signal in the second buffer, and generating, from a multiplexing result, position information indicating a head position of a first packet and an end position of a last packet to be included in each of a plurality of slots.

14. The multiplexing method according to claim 13 comprising:

in a case of generating the transmission multiplexing control information, generating the transmission multiplexing control information based on the position information.

15. The multiplexing method according to claim 12 comprising:

in a case of generating the slot, obtaining the transmission multiplexing control information from the first buffer based on a designated frame synchronization signal, obtaining, from the second buffer, the main signal corresponding to the position information described in the transmission multiplexing control information having been generated the predetermined number of frames prior to the currently obtained transmission multiplexing control information, combining the obtained transmission multiplexing control information and the obtained main signal, and generating the slot.

16. The multiplexing method according to claim 10 comprising:

in a case of writing a time in the second packet, writing a time notified by a clock in the second packet.

17. The multiplexing method according to claim 16 comprising:
- in a case where the second packet is generated, writing a provisional time in the second packet; and
- in a case of writing a time in the second packet, writing a time notified by the clock in the second packet by overwriting the provisional time having been written in the second packet with the time notified by the clock.

18. The multiplexing method according to claim 10, wherein the one or more first packets comprise an MMTP packet, the second packet comprises an NTP packet, the one or more third packets comprise a TLV packet, the transmission multiplexing control information comprises TMCC information, the slot comprises a TLV slot, and the predetermined number of frames comprise two frames.

* * * * *